Figure 1:
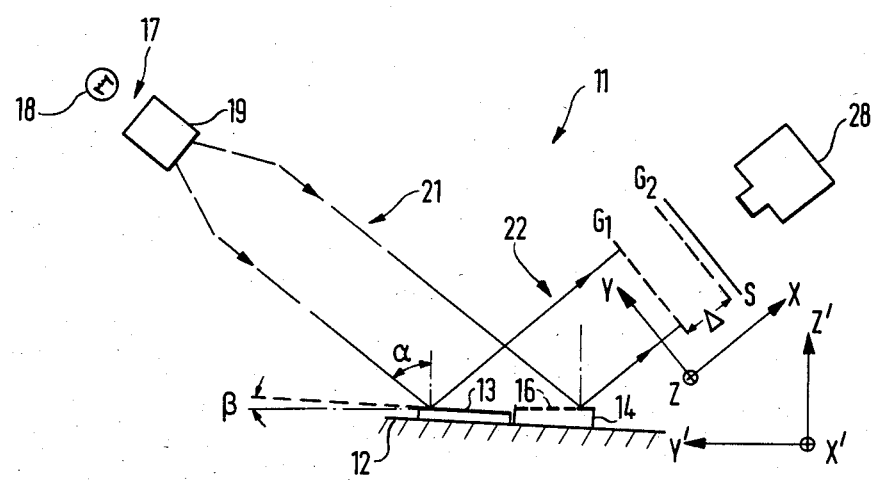

United States Patent [19]

Kafri et al.

[11] Patent Number: 4,600,304

[45] Date of Patent: *Jul. 15, 1986

[54] OPTICAL LEVEL

[75] Inventors: Oded Kafri, Beer-Sheva; Aminadav Livnat, Arad, both of Israel

[73] Assignee: The State of Israel, Atomic Energy Commission, Beer-Sheva, Israel

[*] Notice: The portion of the term of this patent subsequent to Jul. 10, 2001 has been disclaimed.

[21] Appl. No.: 463,323

[22] Filed: Feb. 2, 1983

[30] Foreign Application Priority Data

Jul. 23, 1982 [IL] Israel .................................. 66383

[51] Int. Cl.$^4$ .............................................. G01B 11/14
[52] U.S. Cl. ...................................... 356/138; 356/374; 356/376
[58] Field of Search ............... 356/374, 249, 376, 371, 356/388, 374–378, 381–382, 150, 154, 138; 250/237 G; 33/374–378

[56] References Cited

U.S. PATENT DOCUMENTS

| | | | |
|---|---|---|---|
| 2,811,074 | 10/1957 | Davidson | 356/154 |
| 3,245,307 | 4/1966 | De Lang | 356/374 |
| 3,520,621 | 7/1970 | Blesch et al. | 356/249 |
| 3,706,494 | 12/1972 | Gardner | 250/237 G |
| 4,459,027 | 7/1984 | Kafri et al. | 356/376 |

OTHER PUBLICATIONS

Kawara, "Corneal Topography Using Moire Contour Fringes", Applied Optics, vol. 18, No. 21, 11/1/79 pp. 3675–3678.

Theocaris et al., Slope Measurement by Means of Moire Fringes, Journal of Scientific Instrumentation, 1965 vol. 42, No. 8, pp. 607–610.

Fry et al., Analyzing Rapid Surface Motions with Moire Fringes, Proceedings of the 12th International Congress on High Speed Photography, Aug. 1976.

*Primary Examiner*—R. A. Rosenberger
*Assistant Examiner*—Crystal Cooper
*Attorney, Agent, or Firm*—Browdy and Neimark

[57] ABSTRACT

An optical instrument arrangement for determining the horizontality of a measured surface, where the arrangement comprises a solid reflecting device on a measured surface, a liquid reflecting device on a measured surface, a collimated light source positioned to direct collimated light beams onto both the solid reflecting device and the liquid reflecting device, a device for generating a first Moire fringe pattern from the solid light reflecting device and for also generating a second Moire pattern from the liquid reflecting device; and a device for simultaneously viewing the first and second Moire patterns to determine the horizontality of the measured surface from the shift of the second Moire pattern relative to the first Moire pattern.

8 Claims, 5 Drawing Figures

OPTICAL LEVEL

This invention is concerned with instruments such as levels for measuring the horizontality of flat surfaces and more particularly with optical instruments and methods using Moire deflectometry for measuring the horizontality of flat surfaces.

The necessity of measuring the levelness or horizontality of flat surfaces is important in many fields of engineering. In some of the fields of engineering, for example, construction engineering, low accuracy measurements are sufficient. However, in other fields of engineering high resolution measuring systems are necessary. For example, accurately defined levels are required in optical work where levels having a resolution of at least $10^{-3}$ radians are frequently used.

The most common level instrument is based on the motion of an air bubble in a sealed transparent tube containing a liquid. The tube generally is placed on a ruler with a flat base. A disadvantage of such levels are their low dynamic range. For example, a level designed for high accuracy measurements is not suitable for low accuracy measurements and vice versa. Accordingly it is often necessary to have sets of levels, the high accuracy measurements being accomplished with a relatively long ruler. The relatively long ruler makes it necessary, when measuring the level at two orthogonal angles, to provide a large free space generally greater for example than 200 cm$^2$.

While interferometric techniques would appear suitable for measuring the level where high accuracy is required, such techniques have apparently not been applied, possibly because the high mechanical stability required during interferometric measurement is $\geq 10^{-7}$ m. In industrial applications, such a high stability factor is usually an unattainable requirement. Thus, there is no presently available "level" that can be used to provide the high resolution and accuracy necessary for optical work and also accomplish the measurements of the level with a minimum of expense for instrumentation and with a minimum amount of free space for the measurement purposes.

Accordingly, it is an object of the present invention to provide new and improved instruments and methods for measuring the horizontality of surfaces in which the above-referred to disadvantages are substantially reduced or overcome. According to the present invention an optical level instrument for determining the horizontality of a measured surface is provided, said instrument comprising:

solid reflecting means on the measured surface,
liquid reflecting means on the measured surface,
a collimated light source positioned to direct collimated light beams at said solid reflecting means and at the liquid reflecting means,
a pair of gratings in the path of the light reflected from said solid reflecting means and from said liquid reflecting means,
said gratings being separated by a distance $\Delta$ and being an angle $\theta$ to each other,
screen means located subsequent to said gratings for having Moire fringe patterns projected thereon caused by the reflected light from said solid reflecting means and from said liquid reflecting means through the gratings whereby the horizontality of the measured surface can be determined by measuring the differences between the Moire patterns formed by the reflected light from the solid reflecting means and from the liquid reflecting means.

Yet another feature of the invention is in the method of obtaining the measurement of horizontality of a measured surface, said method comprising the steps of:
collimating a source of light,
directing the collimated light beams onto a solid reflecting surface on the measured surface,
directing the collimated light onto a liquid reflecting means on said measured surface,
directing the collimated light beams reflected from said solid reflecting surface through a pair of Ronchi gratings spaced apart by a distance $\Delta$ and forming an angle to each other $\theta$ thereby forming a first Moire fringe pattern,
projecting said first pattern onto a screen,
recording said first pattern,
directing the collimated light reflected from the liquid reflecting means through said pair of Ronchi gratings to generate a second Moire fringe pattern,
recording said second Moire fringe pattern,
measuring the shift between said first and second Moire fringe pattern, and
determining the horizontality of said surface from said shift.

A further feature of the invention utilizes glycerine in a container as the liquid reflecting means.

Yet another feature of the invention provides for the simultaneous generation of both Moire fringe patterns.

Still another feature of the invention is to use the optical level arrangement to determine the angle of inclination of the measured surface.

Figure 2A:
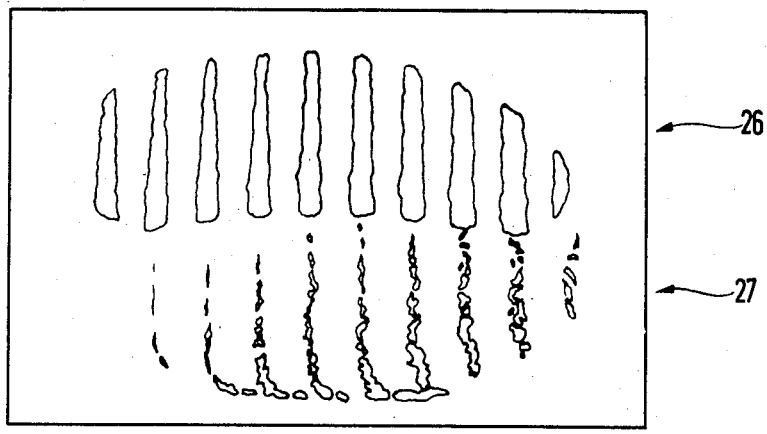
Figure 2B:
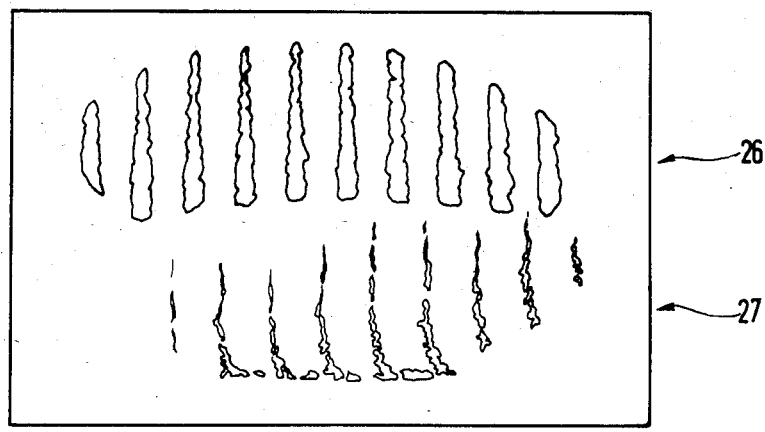
Figure 3A:
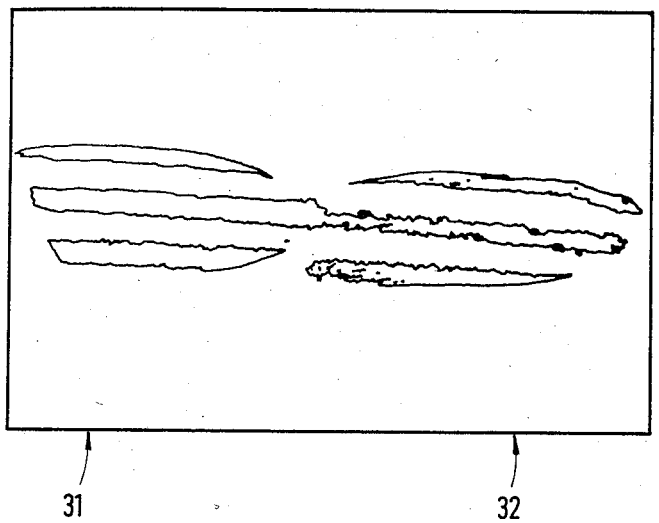
Figure 3B:
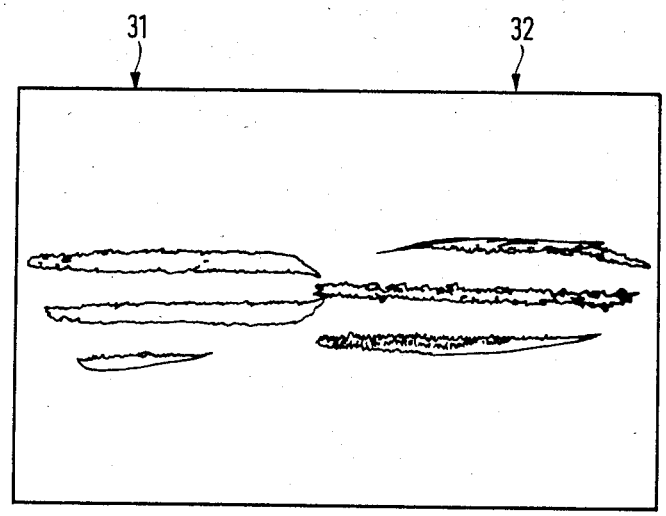

The operation and utilization of the present invention will be more fully apparent from the description of a preferred embodiment taken in conjunction with the following drawings, in which:

FIG. 1 is a schematic showing of the equipment for measuring the level or horizontality of a measured surface, FIG. 2a is a photograph showing the Moire patterns obtained from a liquid reflector and a solid reflector when the measured surface is level, FIG. 2b is a photograph of the Moire fringe patterns obtained from the liquid reflector and the solid reflector when the measured surface is not level, FIG. 3a shows the Moire fringe patterns obtained from the solid reflector and the liquid reflector of FIG. 1 when the measured surface is level in the X'Y' plane, and FIG. 3b shows the Moire fringe patterns obtained from the solid reflector and the liquid reflector when the measured surface is not level along the X' axis in the X'Y' plane.

The optical level instrument arrangement is shown schematically in FIG. 1 at 11. The measured surface whose horizontality or angle of inclination is being determined is shown at 12. A solid reflector means such as mirror 13 is placed on the surface 12. A liquid reflector means such as container 14 having a liquid 16 therein is placed on the surface 12. A collimated light source 17 comprising a source of light 18 and a light collimator 19 is positioned to direct collimated light beams shown generally at 21 onto both the solid reflector and the liquid reflector. A pair of gratings shown as $G_1$ and $G_2$ are positioned so that the light reflected from the solid reflector 13 and the liquid reflector 16 passes through the gratings $G_1$ and $G_2$ onto a screen S. The reflected light is shown generally at 22.

For purposes of illustration and description the gratings $G_1$ and the screen S are shown as being in a ZY plane. The ZY plane is perpendicular to the XZ plane and to the YX plane. The gratings $G_1$ and $G_2$ are spaced apart from each other in the XY plane by a distance $\Delta$. The measured surface is shown as being at an angle $\beta$ to the true horizontal. The angle of incidence of the collimated light striking the solid reflector 13 is shown as being $\alpha$.

In general while there are many instances for use of the arrangements and methods to be described, there are two usual circumstances when the described instruments, arrangements and methods will be used; one is when a surface is being levelled, for example by a screw arrangement for use as an optical base and the other is when the angle of inclination of the surface is being measured.

When the arrangements and methods are used for levelling the measured surface then the Moire fringe pattern is projected onto the screen and is watched while the adjustment is made. The surface adjusting means is operated until the Moire fringes obtained from the solid reflector and from the liquid reflector exactly match. This is shown for example in FIG. 2a where the relatively wide thick lines shown as lines 26 is the Moire fringe pattern projected from the solid reflector and the relatively light thinner lines 27 is the Moire fringe pattern projected from the liquid reflector. By changing the distance $\Delta$ the sensitivity is varied accordingly. Thus, it is possible to obtain the desired sensitivity.

In FIG. 2a the two Moire fringe patterns exactly match indicating that the measured surface is precisely horizontal. In FIG. 2b on the other hand, lines 26 and 27 do not match and in fact lines 27 are midway between the lines 26 indicating a gross mis-match.

When the instrument arrangement of FIG. 1 is used to measure the angular inclination of the measured surface, memory means such as a camera is provided to store the first and second fringe patterns. A picture of the Moire fringe patterns on the screen S is taken with camera equipment shown schematically as camera 28. Pictures such as those seen in FIGS. 2a and 2b result. By measuring the shift of the Moire fringe pattern lines a determination can accurately be made of the angle of inclination of the measured surface, i.e. the angular discrepancy between the horizontal and the actual position of the measured surface. Since the surface can be askew along either of two axes, for example the standard horizontal surface is the X'Y' plane shown in FIG. 1. If the surface is askew along the Y' axis (rotated about the X' axis) such as shown in FIG. 1 and the grooves are parallel to the axis, then the pictures of FIG. 2 would result. If the surface is askew along the X' axis (rotated about the Y' axis) it is necessary to rotate the grating grooves 90° in the gratings plane to obtain the Moire fringe pattern shown in FIG. 3a and 3b. FIG. 3a and 3b show the Moire fringe pattern when the measured surface is rotated about the Y' axes as seen in the X'z' plane.

In FIGS. 3a and 3b the thicker and heavier lines 31 are the lines generated by the reflection from the solid reflector 13. The thinner and lighter lines 32 are the lines reflected from the liquid reflector. The actual angular discrepancy of the measured surface in the X'z' plane can be quantitatively determined with great accuracy from the photograph of FIG. 3b. The actual alignment of the surface can be done by watching the Moire fringe pattern line on the screen while making the necessary adjustments.

It should be noted that the screen S preferably is a semi-transparent screen to facilitate the photographing as shown, for example. The angle $\theta$ is kept small so that $\theta$ is approximately equal to the sine $\theta$ or the tangent $\theta$.

The surface of the liquid will be horizontal and therefore the Moire fringe generated by the liquid and projected on the screen is the fringe that is the standard. What is generated by the solid reflector is different than that generated by the liquid reflector because of the angle $\beta$ between the measured surface and the actual horizontal.

A collimated beam incident to the level surface at an angle $\alpha$ is reflected at the same angle. When the surface is tilted by an angle $\beta$ the reflected beam is rotated by an angle $2\beta$ compared to its original position. Therefore if the measured surface is tilted by an angle $\beta$ the beam is reflected from the liquid reflector and the solid reflector at the relative angle of $2\beta$ causing a translation of the Moire fringe by $h = 2\beta\Delta/\theta$. Thus the angle $\beta$ can be calculated by measuring by measuring the h and with the known values of $\theta$ and $\Delta$.

However, it is simpler to measure the shift of the fringe h in units of the pitch of the Moire pattern; that is measuring the relative shift of the fringe where the relative shift is: $q = h/p'$, $p'$ is the pitch of the Moire pattern. $p'$ is related to the pitch of the gratings according to the equation $p' = p/\theta$. Thus $q = h\theta/p$ or $\beta = qp/2\Delta$.

Then for example from FIG. 2b, $\beta$ can be calculated. The shift is equal to one half pitch. The pitch p in the gratings used was $\frac{1}{4}$ mm. The distance between the gratings $G_1$ and $G_2$ was 92 mm. The calculated angle using the equation for $\beta$ therefore is $6.79 \times 10^{-4}$ radians. Actually the measured surface was set at an angle of $6.75 \times 10^{-4}$ radians. Thus the accuracy of the system is quite good. Those are measurements taken in the Y'Z' plane. Orthogonal measurements may be important to determine the surface slope in the X'Z' plane without touching the surface. This is accomplished by rotating the gratings $G_1$ and $G_2$ simultaneously by 90° in the YZ plane. Then $\beta\perp = q\perp p/2\Delta \tan \alpha$ where $q\perp$ is the relative shift in the perpendicular direction.

To demonstrate a measurement of $\beta\perp$ the gratings of FIG. 1 were rotated by 90°. FIG. 3a is the photograph of the reflection of the liquid reflector and the solid reflector at $\beta\perp = 0$. The angle of incidence a was measured to be 1.279 radians. In FIG. 3b $\beta\perp$ was changed by $2.26 \times 10^{-3}$ radians. The relative shift $q\perp$ according to FIG. 3b is equal to 0.5. p is equal to $\frac{1}{4}$ mm and $\Delta$ is equal to 92 mm as with the calculations from FIG. 2b. $\beta\perp$ is therefore calculated to be $2.257 \times 10^{-3}$ radian, an extremely accurate measurement. Higher sensitivity can be obtained by increasing $\Delta$.

In brief, novel optical levels which may be operated with non-coherent light and under conditions of relatively low mechanical stability has been presented. The instrument arrangement is relatively inexpensive and extremely reliable nonetheless. In the described measurements the collimated light source comprised $\frac{1}{2}$ mwatt helium neon laser equipped with a 3 inch reflection telescope. This provided a sufficiently intense collimated light source. Glycerine was found a suitable liquid due to its high viscosity. The high viscosity helps to prevent waves which would otherwise direct the Moire fringe patterns. It is also within the scope of this invention to float a mirror in a liquid for the liquid reflecting means.

While the principles of the invention have been described above in connection with specific apparatus and applications it is to be understood that this description is made by way of example only and not as a limitation on the scope of the invention.

We claim:

1. An optical instrument arranged for determining the horizontality of a measured surface, said arrangement comprising:

solid reflecting means for placement on said measured surface, liquid reflecting means disposed adjacent to said solid reflecting means for placement on said measured surface with said solid reflecting means, collimated light source positioned to direct collimated light beams onto both said solid reflecting means and said liquid reflecting means, means for generating a first Moire fringe pattern from the solid light reflecting means and for also generating a second Moire pattern from said liquid reflecting means, said means for generating said first and second Moire patterns comprising first and second parallel gratings separated by a known distance $\Delta$ and angularly oriented with respect to one another at a small angle $\theta$, the space between said gratings providing an unobstructed path to enable rays passing said first grating to directly reach said second grating, and screen means for receiving the Moire patterns downstream from said gratings and for simultaneously viewing said first and second Moire patterns to determine the horizontality of said measured surface from the shift of said second Moire pattern relative to said first Moire pattern.

2. A method of optically determining the horizontality of a measured surface, said method comprising the steps of:

generating collimated light beams, directing said collimated light beams at a solid reflecting means on said measured surface and at a liquid reflecting means on said measured surface disposed adjacent to said reflecting means, passing the collimated light reflected from said solid reflecting means and from said liquid reflecting means through a pair of parallel gratings separated by a known distance and angularly oriented with respect to one another to thereby generate a first Moire pattern of light reflected from said solid reflecting means and a second Moire pattern from light reflected from said liquid reflecting means, and determining the horizontality of said measured surface by determining the shift between said first and second Moire patterns.

3. The arrangement of claim 1, wherein memory means are provided for permanently recording the first and second Moire patterns.

4. The arrangement of claim 3, wherein said memory means comprise camera means.

5. The arrangement of claim 1, wherein said liquid reflector means comprises a container with glycerine therein.

6. The arrangement of claim 1, wherein said solid reflector means comprises a mirrored surface.

7. The method of claim 2, wherein said measured surface is varied until said first and second Moire patterns are aligned.

8. The method of claim 2, wherein measurements are made to determine the shift away from alignment of said first and second Moire patterns and wherein calculations are made to determine the angle of tilt of said measured surface.

* * * * *